Figure 1:
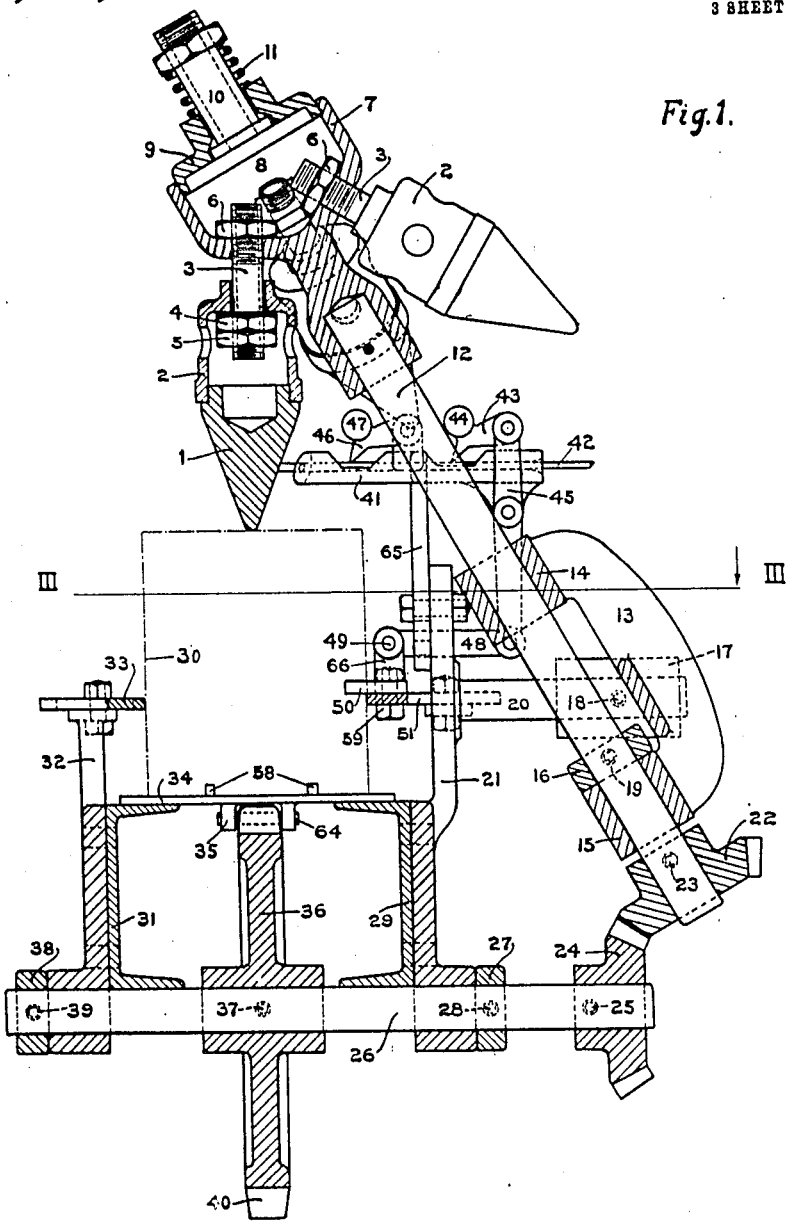

UNITED STATES PATENT OFFICE.

OSWALD H. HANSEN, OF MILWAUKEE, WISCONSIN.

CAN-TIPPING DEVICE.

1,053,809.  Specification of Letters Patent.  Patented Feb. 18, 1913.

Application filed September 16, 1912. Serial No. 720,449.

*To all whom it may concern:*

Be it known that I, OSWALD H. HANSEN, a citizen of the United States, residing at Milwaukee, in the county of Milwaukee and State of Wisconsin, have invented a certain new and useful Improvement in Can-Tipping Devices, of which the following is a specification.

This invention relates to improvements in the construction of canning machinery, and more specifically to automatic tipping devices for canning machines.

An object of the invention is to provide a can tipping device which is simple in construction and efficient in operation.

Some of the specific objects of the invention are as follows:—First, to provide a tipper which may be operated continuously at a relatively high rate of speed without inducing the undesirable jarring and resulting splashing of the canned product which greatly hinders efficient operation of the machines of the prior art. Second, to provide a tipping device in which the weight and the cost of installation and maintenance in general are reduced to a minimum. Third, to provide a device which may be easily and quickly adjusted to operate on cans of different sizes. Fourth, to provide a tipper which may be readily applied to any of the standard can conveyers at present on the market. Fifth, to provide a tipping device in which the soldering means may be easily and quickly adjusted to operate efficiently on cans carried by conveyers having different pitch. Sixth, to provide a device for centering the cans to automatically compensate for stretching of the driving chain of the can conveying means. Seventh, to provide a tipper in which the solder is automatically applied to the soldering means by mechanism operated by the moving can and the solder supplying means automatically returned to normal feeding position by the same can after a sufficient application of solder has been made. Eighth, to provide a tipping device in which the solder is automatically and effectively fed to the soldering means without jarring the mechanism. Ninth, to provide a simple and efficient means for heating the soldering means. Tenth, to provide a machine in which abnormal cans are automatically discharged from the can conveying means before reaching the soldering means.

A clear conception of an embodiment of the invention may be had by referring to the drawings accompanying and forming a part of this specification, in which like reference characters designate the same or similar parts in the different views.

Figure 2:
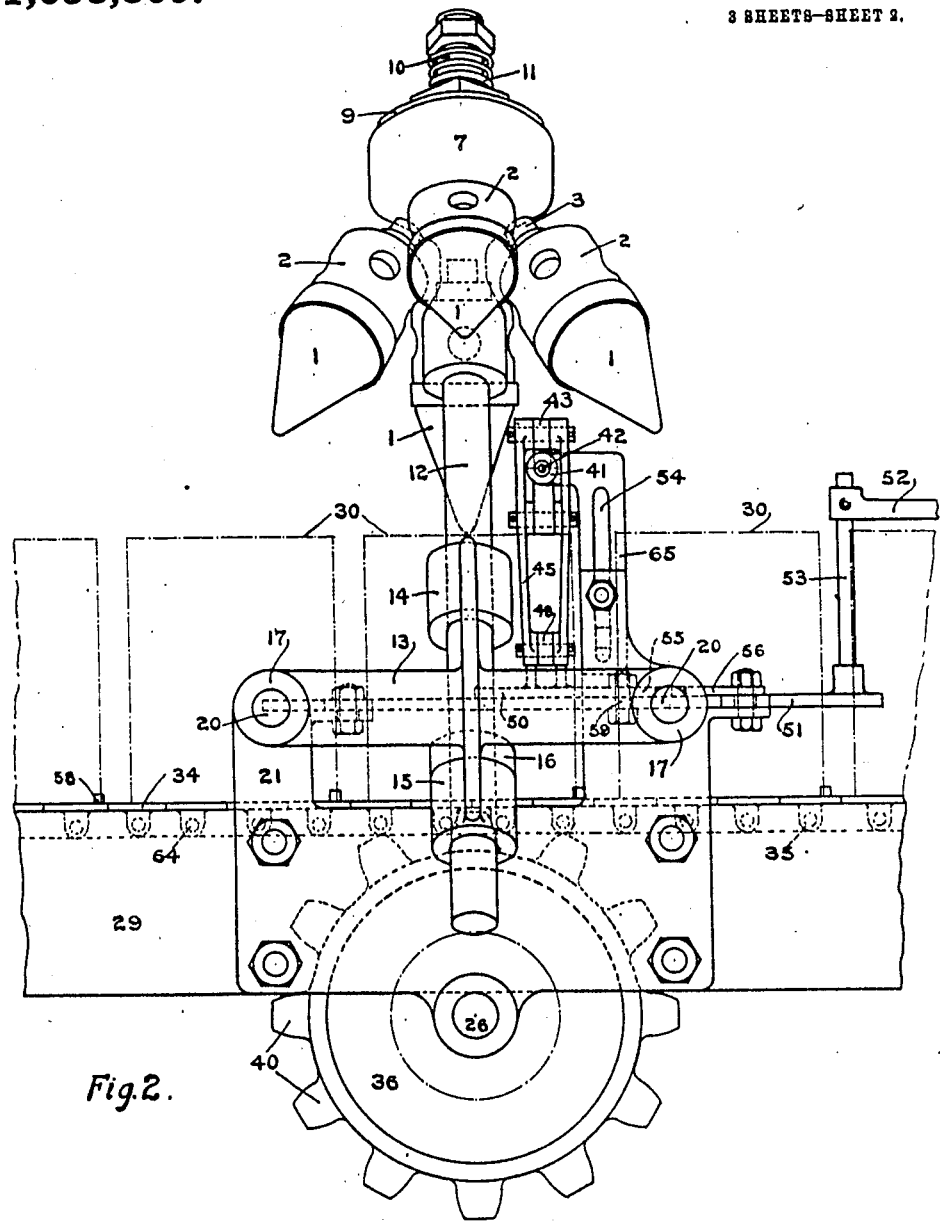
Figure 3:
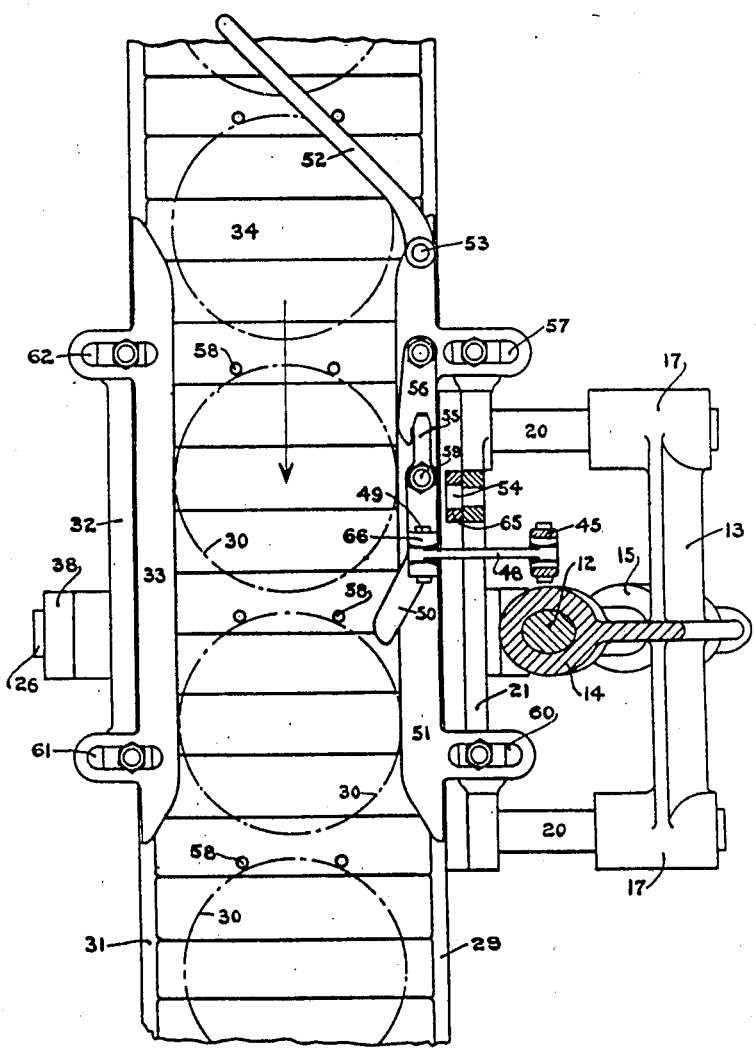

Figure 1 is a central vertical section through a can tipping device and standard conveying means. Fig. 2 is a side elevation of a can tipping device showing a fragment of a standard can conveying means. Fig. 3 is a transverse horizontal section through a can tipping device showing a fragment of the can conveying means, the section being taken along the line III—III of Fig. 1 looking in the direction of the arrow.

The standard can conveying means consists essentially of a pair of horizontally disposed parallel channel irons 29, 31 upon which the conveyer 34 rests and is adapted to travel. The conveyer 34 is formed of a series of elements each of which is provided with a pair of downwardly projecting spaced lugs 35 connected by a pin 64 by means of which the conveyer 34 is continuously advanced. Pins 58 project upwardly from the upper can supporting surfaces of some of the elements comprising the conveyer 34, and form means for positively causing the cans 30 to travel with the conveyer 34. The conveyer 34 is propelled along the channel irons 29, 31 by any of the well known propelling means which are well known to those skilled in the art.

Suitable guiding brackets 21, 32 are secured to the channel irons 29, 31 and carry guide plates 33, 51 which serve to retain the cans 30 in central position on the conveyer 34 while being soldered. These guide plates 33, 51 are provided with slots 61, 62 and 57, 60 respectively, which permit adjustment of the guide plates 33, 51 to a position of effective guiding for cans of various sizes. The guide plate 51 is provided with an inwardly extending vertically adjustable arm 52 which is secured to a fixed supporting rod 53. This arm 52 is located at the end of the guide 51 at which the cans 30 enter the guides 51, 33. The purpose of the adjustable arm 52 is to automatically discharge abnormally high cans 30 from the conveying means by sliding them over the side of the conveyer 34 before they enter the guided portion of the conveying means.

The brackets 21, 32 are provided with downwardly extending portions in which the shaft 26 is rotatably and adjustably supported. The shaft 26 is normally prevented from moving laterally, except during adjustment thereof, by means of collars 27, 38 which are fixed to the shaft 26 by means of set screws 28, 39, or similar devices. The sprocket 36 is secured to the shaft 26 between the channel irons 29, 31 by means of an adjusting set screw 37 or similar securing means. The pitch of the teeth 40 of the sprocket 36 is equal to the distance between successive driving pins 64 of the conveyer 34. The coaction of the teeth 40 of the sprocket 36 with the pins 64 of the conveyer 34 is such that as the conveyer 34 moves along the channel irons 29, 31 it automatically, positively rotates the sprocket 36, thereby rotating the shaft 26. The bevel gear 24 is adjustably secured to an overhanging end of the shaft 26 by means of a set screw 25 or similar device.

The rotatable inclined shaft 12 is mounted in bearings 14, 15 formed in an adjustable frame 13. The adjustable frame 13 is horizontally adjustably supported in bearing portions 17 which are normally fixed to the shafts 20 by means of set screws 18 or similar devices, but which during adjustment are slidable upon the stub shafts 20. The stub shafts 20 are secured to the bracket 21 to form an integral portion thereof. The inclined shaft 12 is axially adjustably supported in the bearings 14, 15 by means of a collar 16 which is normally secured to the shaft 12 by means of a set screw 19 or a similar device. The bevel gear 22 is axially adjustably secured to one end of the shaft 12 by means of a set screw 23 and meshes with and is adapted to be positively rotated by the bevel gear 24 carried by the shaft 26.

The gas supply casing 7 forms an inclosed gas chamber 8 and is fixed to the upper end of the shaft 12. The stationary gas inlet pipe 10 enters the chamber 8 through a removable cap 9 of the casing 7, the joint between the pipe 10 and cap 9 being suitably packed and the packing being assisted by a helical compression spring 11. A series of discharge pipes 3 are adjustably secured to the casing 7 by means of lock nuts 6. Each of the outer ends of these discharge pipes 3 is provided with a pair of lock nuts 4, 5 which form direct supports for the soldering means. Each of the soldering means consists essentially of a soldering copper 1, or similar solder applying device, and a casing 2 forming a heating chamber for the soldering copper 1. The casings 2 are secured to the coppers 1 and coact directly with and are supported by the nuts 4 carried by the pipes 3.

The solder feeding means consists essentially of a stationary solder guide 41 supported by a bracket 65 provided with a slot 54 for permitting vertical adjustment of the bracket 65 upon its supporting bracket 21. The solder 42 is adapted to be fed in the form of a continuous wire through the solder guide from the usual supply, not shown. The stationary pawl 46 which is provided with a weight 47, positively prevents backing up of the solder 42 away from the soldering means. The oscillatory feeding arm 45 is pivoted at its mid portion to a portion of the stationary solder guide 41, and carries at its upper end a pawl 43 which is pressed downwardly by a weight 44. The lower end of the oscillatory arm 45 is connected by means of a link 48 to a pivot 49 carried by a pair of upwardly projecting arms 66 formed in one with the lever 50. The lever 50 has a pivot 59 secured to the guide 51, and is provided with an extension 55 the outer end of which is formed as a gear tooth. This gear tooth extension 55 coacts in a socket formed in the lever 56. The arrangement of the levers 50, 56 is such that when one of them projects into the path of the moving cans 30, the other is withdrawn from this path.

During the normal operation of the device the cans 30 are being successively advanced in series toward the tipper, by means of the conveyer 34. Through the continuous motion of the conveyer 34, the sprocket 36 is positively rotated thereby continuously rotating the horizontal shaft 26. The rotary motion is transmitted directly from the shaft 26 through the bevel gears 24, 22 to the inclined shaft 12. The rotary motion of the inclined shaft 12 causes the series of soldering means which are suspended directly from the pipes 3 carried by the casing 7 to move or revolve in proximity with the conveying means. As the cans 30 successively approach the revolving series of soldering means, the points of the soldering coppers 1 are successively and gradually brought in contact with the portions of the cans 30 to be soldered. After soldering, the coppers 1 are gradually withdrawn from the cans 30 which are eventually discharged from the conveyer 34. Gas is admitted through the stationary gas inlet pipe 10 to the gas chamber 8 from which it passes through the discharge pipes 3 to the interior of the individual casings 2 where it is ignited. The amount of gas thus supplied to the soldering means may be readily regulated by the usual controlling means in the pipe 10.

As the individual soldering means revolve about the shaft 12 and just before they reach a point of contact with the portions of the cans 30 which are to be soldered, the particular can 30 which is about to be soldered, gradually contacts with and displaces the lever 56 as the can passes between the guides 32, 51, see Fig. 3. This contacting of the lever 56 with the can 30, causes the gear tooth projection 55 of the lever 50 to move about the pivot 59 in a direction away from the can 30. This motion of the lever 50 causes the portion of the lever 50 on the other side of the pivot 59 to move gradually inward toward the path of the can, carrying with it the upwardly extending projecting arms 66 and pivot 49, thereby causing the lower end of the lever 45 to move inwardly, toward the cans 30. This inward motion of the lower end of the lever 45 causes the upper end of the lever 45 and the pawl 43 to oscillate outwardly away from the cans 30 thus bringing the pawl 43 to normal feeding position, see Figs. 1 and 3. As the same can 30 which actuated the lever 56, approaches the portion of the lever 50 which after actuation of the lever 56, extends into the path of the cans 30, it comes in contact with the inwardly extending portion of the lever 50 causing it to gradually swing about the pivot 59, whereby the gear tooth projection 55 automatically pushes the lever 56 back into the path of the moving cans 30. The inward motion of the portion of the lever 50 which carries the upwardly extending projecting arms 66 and the pivot 49, causes the upper end of the oscillating lever 45 and the pawl 43 carried thereby, to move inwardly toward the cans and the moving soldering means. The weight 44 causes the pawl 43 in its forward motion, to positively take hold of and advance the solder 42 through the guide 41, and to push the solder 42 directly against one of the soldering coppers 1 as this copper travels continuously past the discharge end of the solder guide 41. At the instant this feeding of the solder 42 against the soldering means is accomplished, the point of the soldering means is automatically brought in contact with the portion of the can 30 to be soldered. The soldering of the can 30 is automatically accomplished by allowing the can 30 to slightly raise the soldering means away from its normal support against the nut 4 and permitting the can 30 to support the weight of the soldering means for a short portion of its revolution. It will thus be seen that as the conveying means continuously advances the series of cans 30, the continuously revolving individual soldering means are automatically successively advanced toward the individual cans 30, supplied with solder, during their travel, brought in contact with and solder the cans 30, and are gradually withdrawn from the cans after soldering has been accomplished.

If it is desired to operate upon cans of a different height, it is necessary only to lower the shaft 12 in the bearings 14, 15 by loosening the set screw 19 and the gear retaining set screw 23. This will cause the point of intersection of the axes of the individual soldering means which in the present instance is located in the plane of travel of the cans 30, to move out of the plane of travel of the cans 30. This point of inter-section can easily be brought back into the plane of travel of the cans 30 by loosening the set screw 18 and sliding the bearing portions 17 upon the stub shafts 20. The driving connection between the shafts 26, 12 may then readily be restored by loosening the set screw 25 and adjusting the bevel gears 22, 24 to the proper positions.

If it is desired to vary the distances between the points of successive soldering means, it is necessary only to loosen the nuts 6 and adjust the pipes 3 to the proper positions relative to the casing 7. Any desired adjustment of the shaft 26 along its axis may be made by loosening the set screws 28, 39 and shifting the shaft 26 the desired amount.

The simplicity of the method of attaching the brackets 21, 32 to the channel irons 29, 31 readily permits the attachment of this can tipping device to any of the standard conveyers now on the market. The positive driving of the tipping device by means of the sprocket 36 which coacts directly with the driving pins 64 of the conveyer 34, provides a simple and efficient means for positively centering the cans 30 to bring the portions of the cans which are to be soldered, in contact with the effective portions of the soldering means, no matter how much the distances between successive pins 64 may have been stretched and varied due to continuous driving of the conveyer 34 thereby. It should also be noted that the solder is effectively and gradually applied to the moving soldering means without in any way jarring the mechanism or the cans 30. This feature permits operation of the device at a relatively high rate of speed. The moving cans 30 moreover automatically actuate the solder feeder to move the solder 42 forward and directly against the soldering means and also to bring the pawl 43 to normal feeding position after feeding, without incorporating the use of unreliable springs in the device.

The casing 7 forming the chamber 8 to which the gas is admitted through the stationary inlet pipe 10 and from which the gas is discharged through the pipes 3 directly to the interiors of the soldering means, also provides a simple and effective means for heating the soldering means with the least waste of gas, since the heat is applied to the soldering means as near to the point of use as it is possible to apply same. The safety arm 52 which projects over the path of the moving cans 30 and which is located a slight distance above the tops of the moving cans 30, provides a simple and effective means for automatically discharging cans 30 which are abnormally high or which have abnormal projections tending to prevent successful operation of the soldering means thereon, before such abnormal cans enter the realm of operation of the soldering means.

The location of the soldering means relative to the revolving shaft 12 from which these means are suspended, also provides an arrangement for permitting the operation of the tipper at a high rate of speed without inducing undesirable jarring. The soldering means are brought gradually in contact with the portions of the cans 30 to be soldered and are after soldering, withdrawn gradually therefrom. Due to the inclination of the axis of revolution of the soldering means, the soldering points of the coppers 1 are retained in contact with the portions of the cans 30 which are to be soldered, for a comparatively long time. The general simplicity of the device permits its construction at a low cost and also reduces the cost of maintenance to a minimum since there are few parts which are liable to become broken and worn.

It should be understood that it is not desired to be limited to the exact details of construction herein shown and described for obvious modifications will occur to a person skilled in the art.

It is claimed and desired to secure by Letters Patent,—

1. In a can tipping device, conveying means for the can, soldering means movable in proximity with said conveying means, and means for moving said soldering means along said conveying means about an axis which is inclined to the axis of said can.

2. In a can tipping device, conveying means for the can, soldering means revoluble in proximity with said conveying means, and means for revolving said soldering means about an axis which is inclined to the axis of said can.

3. In a can tipping device, conveying means for the can, power transmitting means connected directly to said conveying means, soldering means in proximity with said conveying means, and means operable by said power transmitting means for moving said soldering means about an axis which is inclined to the axis of said can.

4. In a can tipping device, conveying means for the can, power transmitting means connected directly to said conveying means, soldering means revoluble in proximity with said conveying means, and means operable by said power transmitting means for revolving said soldering means about an axis which is inclined to the axis of said can.

5. In a can tipping device, conveying means for the can, power transmitting means deriving actuating power directly from said conveying means, soldering means revoluble in proximity with said conveying means, and means actuated directly by said power transmitting means for positively revolving said soldering means.

6. In a can tipping device, conveying means for the can, power transmitting means deriving actuating power directly and continuously from said conveying means, soldering means revoluble in proximity with said conveying means, and means actuated directly and continuously by said power transmitting means for positively revolving said soldering means.

7. In a can tipping device, conveying means for the can, soldering means having an axis and movable in proximity with said conveying means, and means rotatable about an axis for moving said soldering means, the axis of said soldering means being inclined to the axis of said rotatable means.

8. In a can tipping device, means for continously advancing a series of cans, a series of soldering means each successively movable toward one of said cans, and means for moving said soldering means about an axis which is inclined to the axes of said cans.

9. In a can tipping device, a rotatable shaft having its axis inclined relative to a horizontal plane, soldering means suspended from said shaft, means for advancing a can toward and to a position of contact with said soldering means, and means for adjusting said soldering means to operable position for various sized cans.

10. In a can tipping device, means for advancing a can with its axis in a vertical position, soldering means movable toward and to a position of contact with said can about an axis which is inclined to the axis of said can, and means for adjusting said soldering means to operable position for various sized cans.

11. In a can tipping device, a rotatable shaft having its axis inclined relative to a horizontal plane, soldering means suspended from said shaft, means for advancing a can toward and to a position of contact with said soldering means, and means for adjusting said soldering means in at least two directions.

12. In a can tipping device, conveying means for the can, a shaft adjacent said conveying means, positive driving means for communicating power directly from said conveying means to said shaft, a second shaft, a positive driving connection between said shafts, means for adjusting said shafts relative to each other, and soldering means suspended from said second shaft.

13. In a can tipping device, conveying means for the can, means rotatable directly from and by the movement of said conveying means, a second rotatable means, an adjustable driving connection between said two rotatable means, and soldering means carried by said second rotatable means, said soldering means being revoluble in proximity with said conveying means.

14. In a can tipping device, conveying means for the cans, a plurality of soldering means revoluble in proximity with said conveying means and about an axis which is inclined relative to a horizontal plane, and means for varying the distance between successive soldering means.

15. In a can tipping device, a rotatable shaft having an axis which is inclined relative to a horizontal plane, soldering means suspended from said shaft, means for advancing a can toward said soldering means, and means driven directly by said advancing means for positively bringing said soldering means in contact with the portion of the can to be soldered.

16. In a can tipping device, conveying means for the can, a rotatable shaft adjacent said conveying means, a sprocket for transmitting motion from said conveying means to said shaft, a second shaft adjacent said rotatable shaft, gearing connecting said shafts, and soldering means suspended from said second shaft and revoluble in proximity with said conveying means.

17. In a can tipping device, means for continuously advancing a series of cans, a series of soldering means each successively movable toward one of said cans about an axis which is inclined relative to a horizontal plane, driving means connected with said advancing means, and means actuated directly by said driving means for positively bringing said soldering means in contact with the portion of the can to be soldered.

18. In a can tipping device, means for advancing a can, soldering means revoluble in proximity with said advancing means, and common means operable by said can when in motion for both automatically feeding solder to said soldering means and for returning said solder feeding means to normal position.

19. In a can tipping device, means for advancing a can, soldering means movable in proximity with said advancing means, solder feeding means operable by said can when in motion for automatically feeding solder to said soldering means, and means operable by said moving can for returning said solder feeding means to normal feeding position.

20. In a can tipping device, means for advancing a can, soldering means movable in proximity with said advancing means, and means for automatically feeding solder to said soldering means, said feeding means comprising an oscillatory pawl, means for actuating said pawl to advance the solder, and means operable by a can when in motion for returning said pawl to normal feeding position.

21. In a can tipping device, a rotary shaft, a casing forming a chamber carried by said shaft, inlet means connected with said casing, a discharge pipe carried by said casing, and soldering means suspended directly from said discharge pipe, said soldering means and discharge pipe being supported directly by said casing.

22. In a can tipping device, a rotary shaft, a casing forming a chamber carried by said shaft, stationary inlet means connected with said casing, a discharge pipe carried by and adjustable in said casing, and soldering means suspended directly from said discharge pipe, said soldering means and discharge pipe being supported directly by said casing.

23. In a can tipping device, a rotary shaft, a casing forming a chamber carried by said shaft, inlet means connected with said casing, rigid means forming a discharge passage suspended from said casing, soldering means supported directly by said casing and suspended from said rigid discharge means, and means for advancing a can to a position of contact with said soldering means whereby said soldering means is disengaged from its normal support by said advancing can.

24. In a can tipping device, conveying means for the can, soldering means movable in proximity with said conveying means, and solder feeding means comprising a stationary solder guide having its delivery end adjacent the path of said movable soldering means, means for delivering solder from said guide and toward said soldering means during the movement of said soldering means past said guide, and means operable by the can for returning said solder delivering means to normal delivering position.

25. In a can tipping device, conveying means for the can, a plurality of soldering means movable in proximity with said conveying means, a single feeder for successively delivering solder directly toward and against each of said moving soldering means, and means operable by the can for returning said feeder to normal feeding position.

26. In a can tipping device, conveying means for the can, soldering means continuously revoluble in proximity with said conveying means, means for feeding solder directly toward and against said continuously revolving soldering means, and means operable by the can for returning said feeding means to normal feeding position.

In testimony whereof, the signature of the inventor is affixed hereto in the presence of two witnesses.

OSWALD H. HANSEN.

Witnesses:
W. H. LIEBER,
CHAS. N. PETERSON.

Copies of this patent may be obtained for five cents each, by addressing the "Commissioner of Patents, Washington, D. C."